(12) United States Patent
Heuer

(10) Patent No.: US 6,999,412 B2
(45) Date of Patent: Feb. 14, 2006

(54) METHOD OF OPERATING A DATA TRANSMISSION NETWORK

(75) Inventor: Volkmar Heuer, Ditzingen (DE)

(73) Assignee: Alcatel, Paris (FR)

( * ) Notice: Subject to any disclaimer, the term of this patent is extended or adjusted under 35 U.S.C. 154(b) by 1001 days.

(21) Appl. No.: 09/899,984

(22) Filed: Jul. 9, 2001

(65) Prior Publication Data

US 2002/0021663 A1    Feb. 21, 2002

(30) Foreign Application Priority Data

Jul. 26, 2000  (DE) ................................. 100 36 222

(51) Int. Cl.
*H04L 12/28* (2006.01)
(52) U.S. Cl. ........................ 370/223; 370/405; 398/4

(58) Field of Classification Search ................ 370/217, 370/218, 222, 223, 225, 237, 353–355, 390, 370/395.21, 404–406, 452; 398/2–4, 45, 398/12
See application file for complete search history.

(56) References Cited

U.S. PATENT DOCUMENTS 6,307,859 B1 * 10/2001 Tedenstig .................... 370/401
6,643,464 B1 * 11/2003 Roorda et al. ................ 398/59

* cited by examiner

*Primary Examiner*—Wellington Chin
*Assistant Examiner*—John Shew
(74) *Attorney, Agent, or Firm*—Sughrue Mion, PLLC

(57) ABSTRACT

A method of operating a data transmission network (10) is described comprising at least two outer rings (11, 13) and a middle ring (12) which are coupled to one another via nodes (14, 15, 16). One of the nodes (14) represents a central node for all three rings (11, 12, 13). Switching devices (23, 24, 25, 26) for the establishment of connections are contained in each of the nodes (14, 15, 16). It is recognized that a connection is to be established from the one outer ring (11, 13) to the other outer ring (13, 11) via the middle ring (12). Then the connection is established taking into account all three rings (11, 12, 13).

14 Claims, 6 Drawing Sheets

METHOD OF OPERATING A DATA TRANSMISSION NETWORK

This application is based on and claims the benefit of German Patent Application No. 100 36 222.2 filed 'Jul. 26, 2000', which is incorporated by reference herein.

FIELD OF THE INVENTION

The invention relates to a method of operating a data transmission network comprising at least two outer rings and a middle ring which are coupled to one another via nodes, wherein one of the nodes represents a central node for all three rings and wherein switching devices for the establishment of connections are contained in each of the nodes.

DESCRIPTION OF THE RELATED ART

A data transmission network of this kind is generally known and basically represents an arrangement of the rings in different directions, thus "cross-wise". If, in this data transmission network, a connection is to be established from the one of the two outer rings to the other outer ring, this connection is divided into two sub-connections. The one sub-connection extends from the one of the two outer rings to the middle ring and the other sub-connection extends from the middle ring to the other outer ring. The two sub-connections are thus directed in "different directions" of the data transmission network. The two sub-connections are established and operated entirely independently of one another and each require nodes arranged between the rings with associated switching devices. Measures against defects possibly occurring in the rings are provided for both sub-connections independently of one another.

The component outlay as well as the control outlay is relatively high in the case of the above described operation of the data transmission network.

BRIEF DESCRIPTION OF THE INVENTION

The object of the invention is to provide a method of operating a data transmission network which also facilitates a "diagonal" connection without requiring additional technical installations.

According to the invention, this object is achieved in a method of the type referred to in the introduction in that it is recognized that a connection is to be established from the one outer ring to the other outer ring via the middle ring, and that the connection is established taking into account all three rings.

In contrast to the prior art, in which only two rings are ever considered in association with the establishment of a connection, in the invention all three rings are taken into account in the establishment of the connection. This opens up the possibility of establishing the connection from the one of the two outer rings to the other outer ring via the middle ring such that on the one hand the same protection against possible defects in the three rings exists as in the prior art, but on the other hand no additional component—or control outlay is required for the connection.

It is essential that, in accordance with the invention, in a first step it is recognized that all three rings are required for the desired connection, and that then in a second step all three rings are also jointly taken into account for the establishment of the connection. This measure alone overcomes the complicated procedure of the prior art in which only two rings are ever taken into account in the establishment of a connection. The manner in which the actual connection between the two outer rings is then established is immaterial. Various options exist for this purpose. As stated, what is important is that all three rings are jointly considered and operated for this connection establishment.

In an advantageous embodiment of the invention the connection is established as follows: at a start point the connection is divided into two parallel connections and routed via one of the two outer rings—the two parallel connections are routed to a switching device in the central node and to a switching device in one of the two other nodes—from each of the two switching devices a connection is in each case routed to the respective other switching device-from the two switching devices two parallel connections are routed via the middle ring to the other outer ring-at an end point the two parallel connections are re-integrated. This procedure represents for example an advantageous possible implementation of the invention. However, as stated there are also other options for establishing the connection between the two outer rings of the data transmission network.

In an advantageous further development of the invention, the middle ring comprises two connections parallel to one another, the connection being established via one of the two parallel connections. This provides another possibility of eliminating defects. In the case of this so-called dual-node-ring-coupling two rings are connected to one another via two separate nodes. Here a node can consist of one or more network elements. In accordance with the invention it is advantageous to implement the middle ring in this way.

In other advantageous further developments of the invention at least one of the rings has the form of a shared-protection-ring-connection, it being possible for at least one ring and at least one shared-protection-ring-connection to be combined with one another. In this way the invention can also be used in association with a shared-protection-ring connection.

Further features, possible applications and advantages of the invention are set forth in the following description of exemplary embodiments of the invention which are illustrated in the figures of the drawing. Here all the described or represented features constitute the subject of the invention, either individually or in any combination and irrespective of their combination in the claims or their dependencies and irrespective of their wording in the description or representation in the drawing.

DESCRIPTION OF PREFERRED EMBODIMENTS OF THE INVENTION

Figure 1:
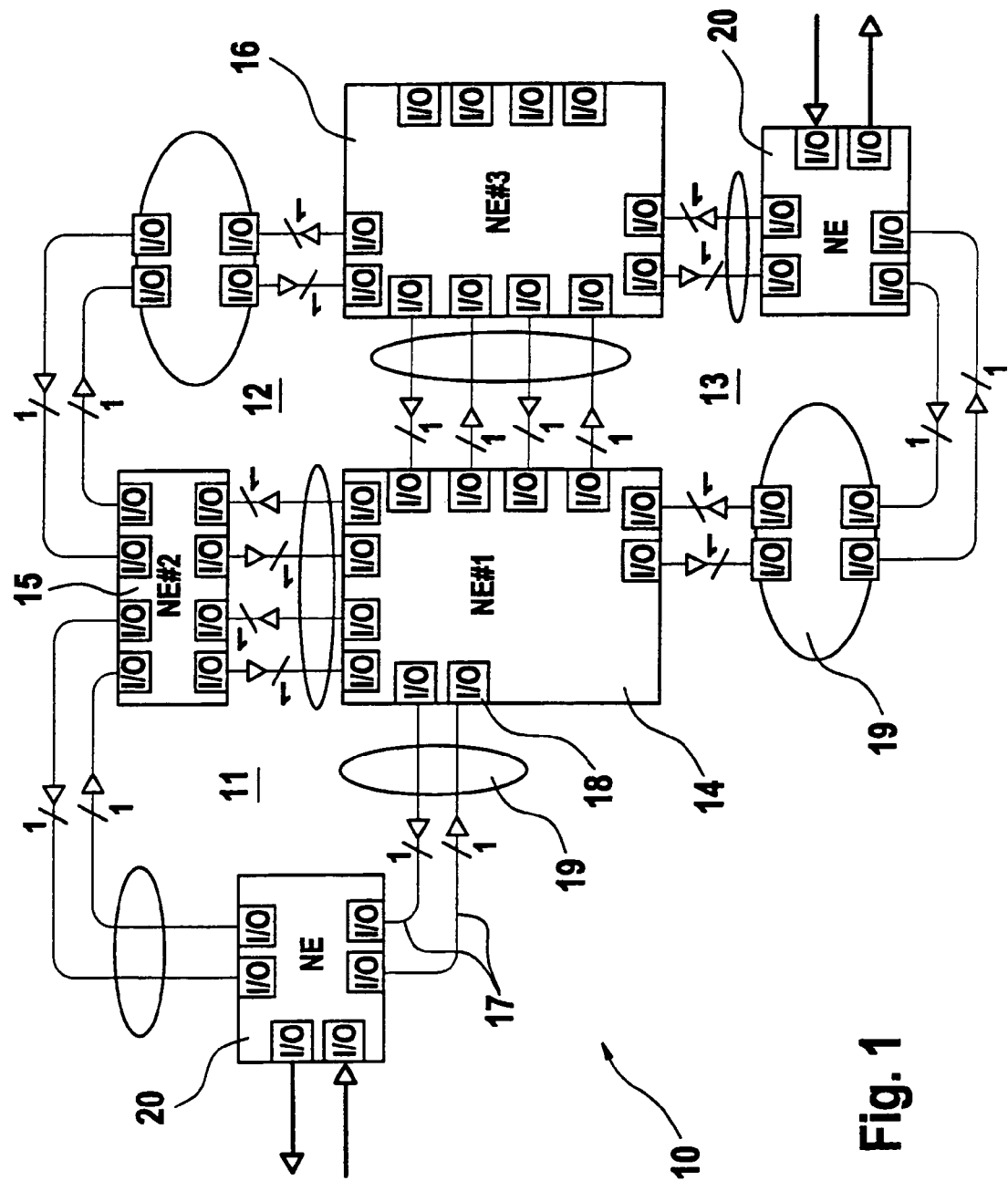
FIG. 1 is a schematic block diagram of an exemplary embodiment of a data transmission network according to the invention.

FIG. 1 illustrates a data transmission network 10 in terms of its physical construction. The data transmission network 10 comprises three rings 11, 12, 13 which can also have the form of meshes. The rings 11, 12, 13 are coupled to one another via nodes 14, 15, 16 which are also referenced "NE#1", NE#2" and "NE#3" in FIG. 1 (NE=network element).

The nodes 14, 15, 16 are located at a distance from one another. The connections of the nodes 14, 15, 16 via the rings 11, 12, 13 are implemented by means of cables 17 which are each connected to an input- or output card 18 of the nodes 14, 15, 16. The input- or output cards 18 are also referred to as "I/O" (I/O=input/output). The transmission directions of the cables 17 defined on the basis of the input- or output cards 18 have been indicated by arrows in FIG. 1.

The cables 17 can consist of coaxial cables, glass- or plastic cables or lambda cables. It is also possible to provide cable-free connections, thus for example radio-based transmission links, in place of the cables 17.

Further networks 19, integrated via further input- or output cards 18, can be contained in the rings 11, 12, 13. The nodes 14, 15, 16 can also be provided with further input- or output cards 18 to which further cables 17 can be connected.

The rings 11, 13 are provided with further nodes 20 via which a signal can be input-coupled in both directions. This is indicated by arrows in FIG. 1. The nodes 20 are also referenced "NE". The signal is to be transmitted via the data transmission network 10 illustrated in FIG. 1, and is to be transmitted from the ring 11 to the ring 13 and vice versa from the ring 13 to the ring 11.

The nodes 14, 15, 16, 20 are characterized by the fact that any simple or complex connections can be switched between the input- or output cards 18 via said nodes. These comprise simple unidirectional or bi-directional connections, as well as complex connections, such as for example so-called broadcast connections or so-called sub-network-connection-protection-connections which can each be connected to arbitrary input- or output cards 18. The connections can be established with the aid of a switching matrix present in each of the nodes 14, 15, 16, 20. The switching matrices are operated by a control device which switches over the switching matrices into the switching positions required for the particular desired connections. The control device in each case contains a computing device which determines the required switching positions with the aid of a program.

Figure 2:
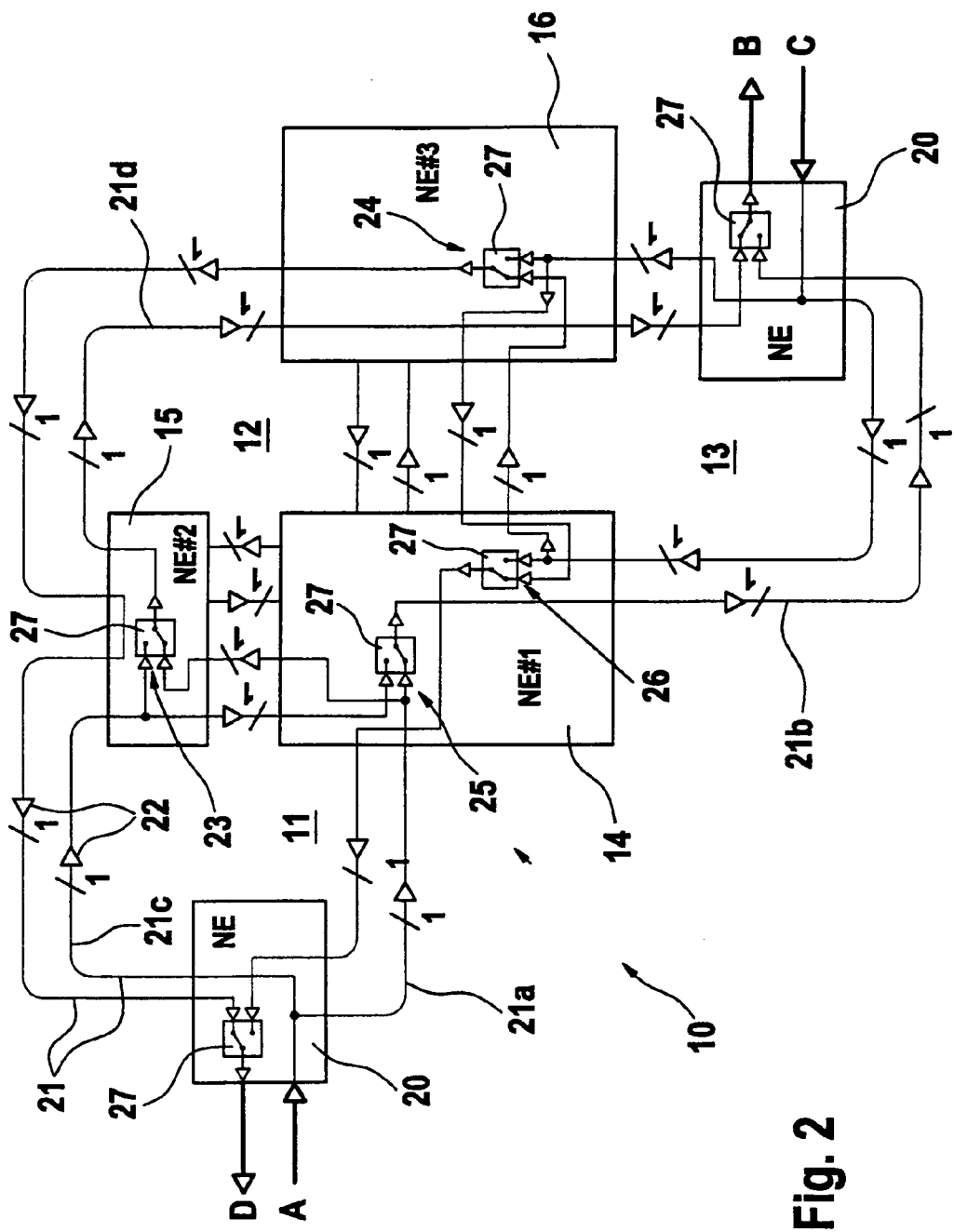
FIG. 2 is a schematic block diagram of a first exemplary embodiment of a method according to the invention for operating the data transmission network shown in FIG. 1.
Figure 3:
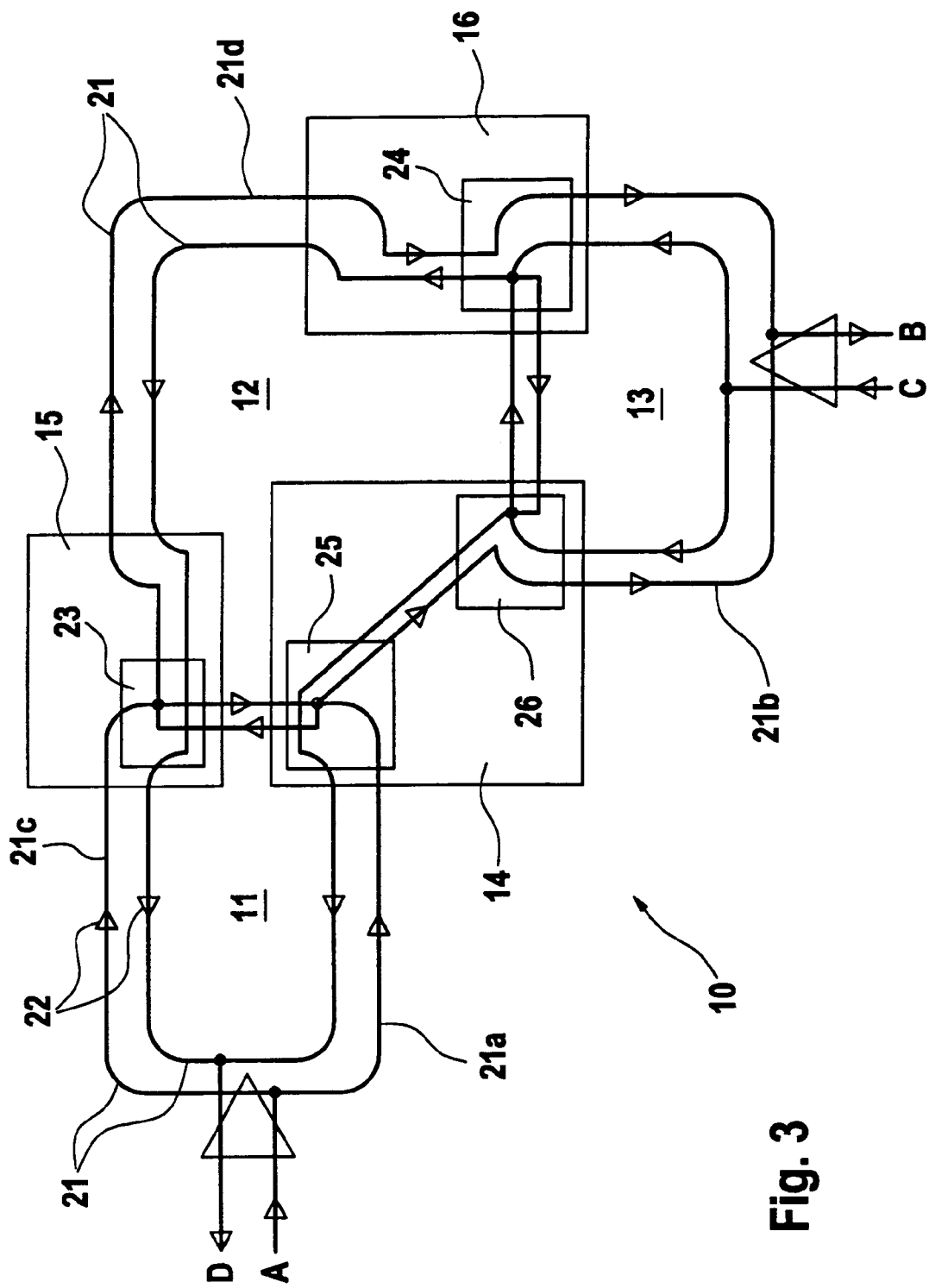
FIG. 3 shows the block diagram according to FIG. 2 in a simplified form.

The data transmission network 10 is illustrated in terms of its logical construction in FIGS. 2 and 3. The nodes 14, 15, 16, 20 have been shown in detail in FIG. 2 whereas they have been shown only in simplified form in FIG. 3.

The data transmission network 10 can consist of a digital network, e.g. an ATM- or IP- or SDH/SONET network. However the data transmission network 10 can also be implemented as an optical network.

As illustrated in FIG. 1, the nodes 14, 15, 16 are coupled to one another via the cables 17. However FIGS. 2 and 3 do not depict these cables, but logical connections 21 which can be established via the cables. The logical connections 21 are provided with arrows 22 which indicate the direction of the data transmission on the respective logical connection 21.

The node 15 connects the two rings 11, 12 to one another. For this purpose the node 15 contains a switching device 23. The node 16 connects the two rings 12, 13 to one another and for this purpose contains a switching device 24. The node 14 couples all three rings 11, 12, 13 to one another and thus represents a central node. For this purpose the node 14 contains two switching devices 25, 26.

The switching devices 23, 24, 25, 26 are illustrated in FIG. 3.

The switching devices 23, 24, 25, 26 are all of similar construction and are also referred to as "drop-and-continue circuit", abbreviated to D&C. Each of the switching devices 23, 24, 25, 26 has three pairs of connections each comprising one incoming and one outgoing connection. Additionally each of the switching devices 23, 24, 25, 26 on the one hand contains a switch 27, with which one of the outgoing connections can be switched back and forth between two of the incoming connections, and on the other hand contains a branching or so-called broadcast with which one incoming connection is divided between two outgoing connections. The switches 27 are illustrated in FIG. 2.

By means of the switches 27 a so-called "sub-network connection protection", also abbreviated to SNCP, is achieved. The nodes 20 of the rings 11, 13 likewise contain switches 27 of this kind for the purpose of the SNCP.

The switches 27 are operated by the control device. The control device can consist of a computing device which switches over the individual switches 27 into the desired switching positions as a function of a program.

The switches 27 are always switched back and forth by the control device, such that the better incoming connection is a switched through. This means that the control device checks the quality of the two connections incoming at a switch 27 and that the control device then switches through the incoming connection with the better quality to the outgoing connection. If for example an interruption or other defect is present in one of the two incoming connections, this is recognized by the control device and the control device then selects the other, better connection for the onward routing. In this way it is possible to eliminate a fault present in the data transmission network 10.

The switches 27 are thus operated such that the connections remain in existence even if a cable between two of the nodes 14, 15, 16 is defective and the connections implemented via this cable thus are no longer present, or if one of the nodes 14, 15, 16 is defective and thus logical connections can no longer be implemented via this node.

This is to be explained in the following example with reference to FIGS. 2 and 3. In the example a connection is to be established from a start point A to an end point B.

Following the start point A the connection divides into a connection to the switching device 23 and a connection in parallel thereto to the switching device 25, and in each case to one of the two switch-selectable terminals of the switches 27. From here a connection in each case extends to the respective other switch-selectable terminal of the switch 27 of the other switching device 25, 23. The respective common terminal of the switches 27 of the two switching devices 23, 25 then lead via two parallel connections to the end point B where they are re-integrated.

A first option for the connection from A to B thus consists of the connections 21a, 21b. The switch 27 of the switching device 25 here is switched into its non-illustrated switching position.

It will now be assumed that the connection 21a is interrupted, the connection 21b is in order, and the switching devices 23, 24, 25, 26 are also in order. In this case an option for the connection from A to B consists of the connections 21c, 21b. The switch of the switching device 25 here is switched into its illustrated switching position.

It will be assumed that the connection 21b is interrupted but the connection 21a is in order. Then an option for the connection from A to B consists of the connections 21a, 21d. Here the switch 27 of the switching device 23 is switched into its illustrated switching position.

Finally it will be assumed that the two connections 21a, 21b are interrupted. In this case the option for the connection from A to B consists of the connections 21c, 21d. The switch 27 of the switching device 23 here is switched into its non-illustrated switching position.

The switch 27 of the node 20 is always switched such that the connection from A to B is fully established.

The above mentioned, assumed interruptions can be arbitrarily continued, it being possible in all cases for the interruption of a single one of the connections 21a, 21b, 21c, 21d to be eliminated again by appropriate switching-over of the switching devices 23, 24, 25, 26.

It will now be assumed that the connections 21a, 21b, 21c, 21d are not interrupted but the switching device 25 is defective. In this case the option for the connection from A to B consists of the connections 21c, 21d. The switch 27 of the switching device 23 here is switched into its non-illustrated switching position.

It will also be assumed that now the switching device 23 is defective. Then an option for the connection from A to B consists of the connections 21a, 21b. The switch 27 of the switching device 25 here is switched into its non-illustrated switching position.

These assumed defects can be arbitrarily continued, it being possible in all cases for the defect of one single switching device 23, 24, 25, 26 to be eliminated again by appropriate switching-over of the other switching devices 23, 24, 25, 26.

The same also applies to the opposite direction, thus to a connection from a point C to a point D.

The control device with which the switching devices 23, 24, 25, 26 are controlled is capable of recognizing whether the establishment is to take place of a connection which extends across three rings 11, 12, 13 and in the case of which all three rings 11, 12, 13 can be coupled to one another via a central node 14.

The above situation always represents a "cross-wise" connection, thus a connection in which not only consecutive rings are to be connected to one another "in one direction" but a plurality of rings are to be connected to one another "in different directions".

As soon as the control device has recognized this situation, the control device operates the switching devices 23, 24, 25, 26 and the aforementioned switching matrices such that one of the connection options described in the example takes place. The switching devices 23, 24, 25, 26 here are connected to one another and to the input- or output cards 18 via the switching matrices configurable by the control device. In this way the connections are influenced by the control device simultaneously via all three rings.

In the described example the switching devices 23, 24, 25, 26 are simultaneously operated by the control device such that each of the two outer rings 11, 13 extends via the middle ring 12 to the respective other outer ring 13, 11. In this way only one of the two switching devices 23, 25 of the central node 14 is ever required to establish a connection from one of the two outer rings 11, 13 to the other outer ring 13, 11 via the middle ring.

Figure 4:
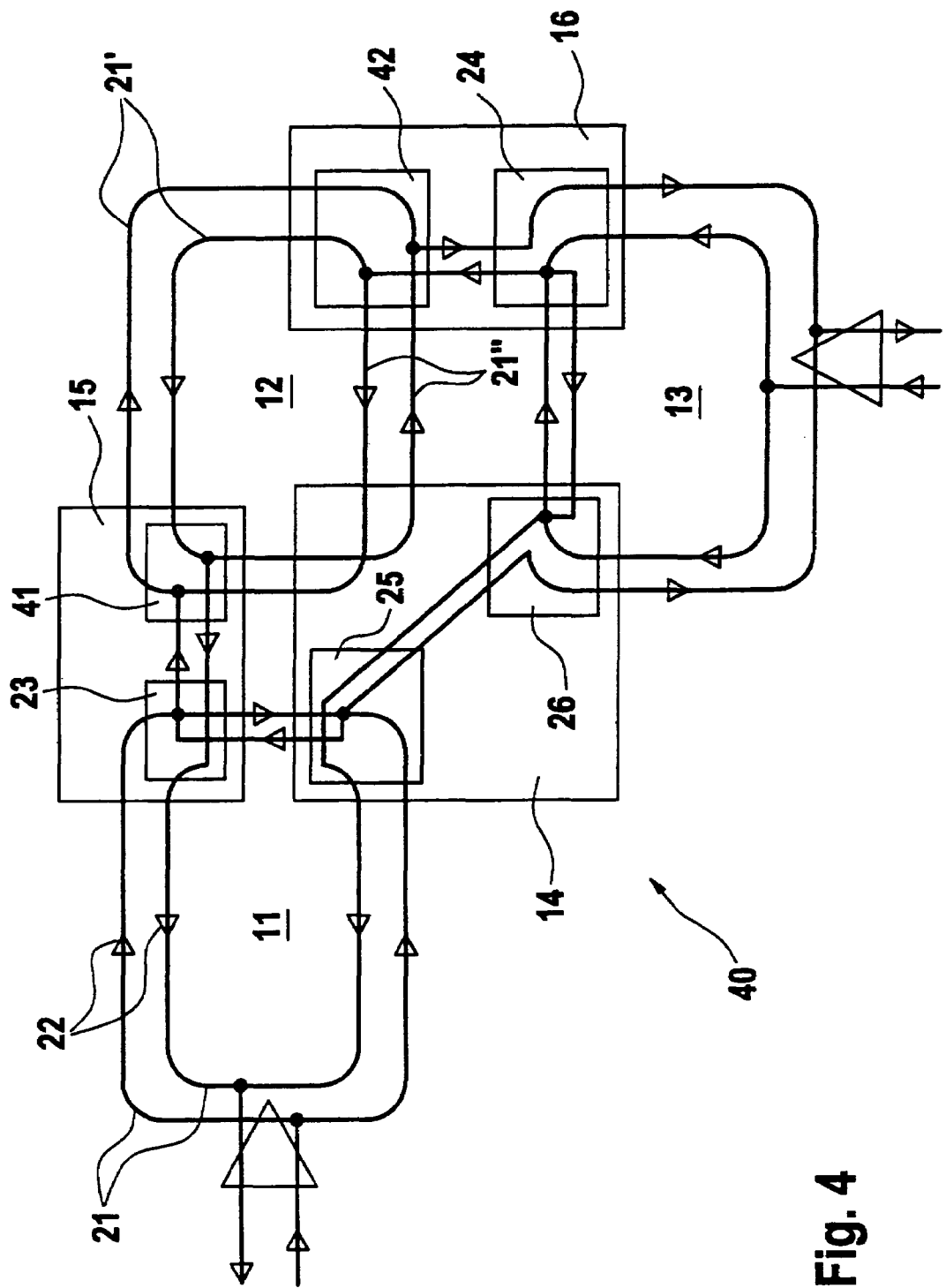
FIG. 4 is a simplified schematic block diagram of a second exemplary embodiment of a method according to the invention for operating a data transmission network.

FIG. 4 illustrates a data transmission network 40 which corresponds substantially to the data transmission network 10 in FIGS. 1 to 3. Corresponding features have therefore been provided with identical reference symbols.

In contrast to FIG. 1, the data transmission network 40 shown in FIG. 4 comprises an extension within the middle ring 12. Here the two connections 21 are not established in a simple manner as in FIG. 1 but the connections 21 are each implemented via two respective parallel connections 21', 21" parallel to one another. At the junctions into the connections 21', 21" circuits 41, 42 are provided which can each on the one hand divide and on the other hand integrate connections. The division here is also known as "broadcast function" and the integration is effected by means of the SNCPs already referred to. The switches of the SNCPs are switched into the particular required position by the control device.

In FIG. 4 it is thus possible, in addition to FIG. 1, to eliminate an interruption which has occurred for example in the connections 21' by switching over the switches of the circuits 41, 42 to the connections 21".

Figure 5:
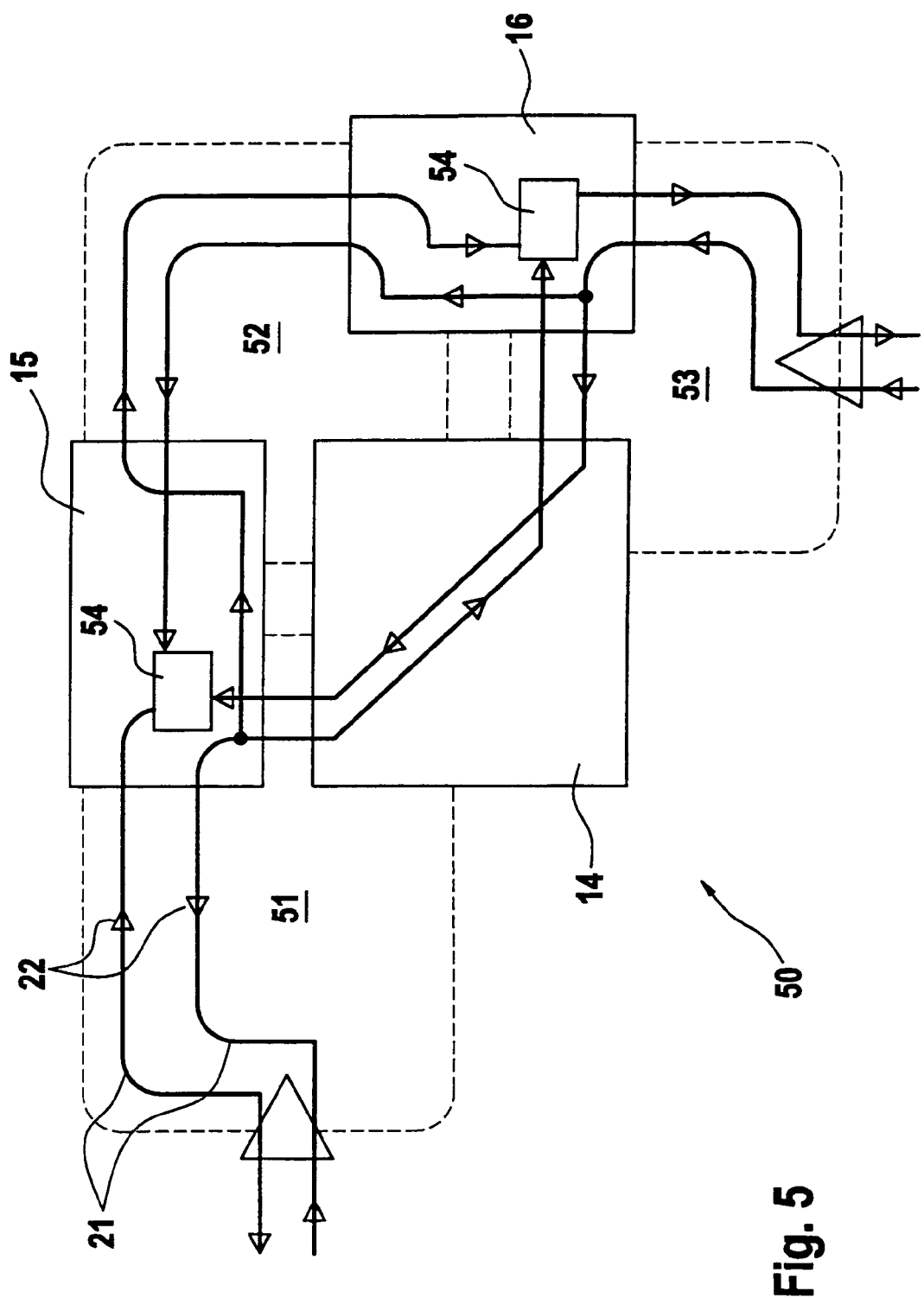
FIG. 5 is a simplified schematic block diagram of a third exemplary embodiment of a method according to the invention for operating a data transmission network and FIG. 6 is a simplified schematic block diagram of a fourth exemplary embodiment of a method according to the invention for operating a data transmission network.

FIG. 5 illustrates a data transmission network 50 which corresponds substantially to the data transmission network 10 in FIGS. 1 to 3. Corresponding features have therefore been provided with the same reference symbols.

In the data transmission network 50 shown in FIG. 5 so-called shared-protection-ring-connections 51, 52, 53 are provided in place of the rings 11, 12, 13 shown in FIGS. 1 to 3. These are connections 51, 52, 53 between the nodes 14, 15, 16 in the case of which the shared-protection-ring-process is used for fault elimination. In SDH/SONET networks this process is implemented as so-called MS-SPRING process. In such shared-protection rings the available protection capacity is shared by one or more signals to be protected.

Furthermore, in the data transmission network 50 according to FIG. 5, selectors 54 are provided in the nodes 14, 15, 16 in place of the switching devices 23, 24, 25, 26 shown in FIGS. 1 to 3 and in particular the SNCPs contained therein. Here the selectors 54 are required only in the two nodes 15, 16 but not in the central node 14. This node 14 contains no switches or the like.

The two selectors 54 each select the better of the two incoming connections and route this connection onwards. The selectors 54 shown in FIG. 5 thus correspond in terms of their function to the switching devices 23, 24, 25, 26 of FIGS. 1 to 3.

As a deviation from FIG. 5 it is possible for not all three connections 51, 52, 53, but only the two outer connections 51, 53 to be provided as shared-protection-ring process. The middle, central connection 52 thus can also be implemented without the shared-protection-ring process.

Figure 6:
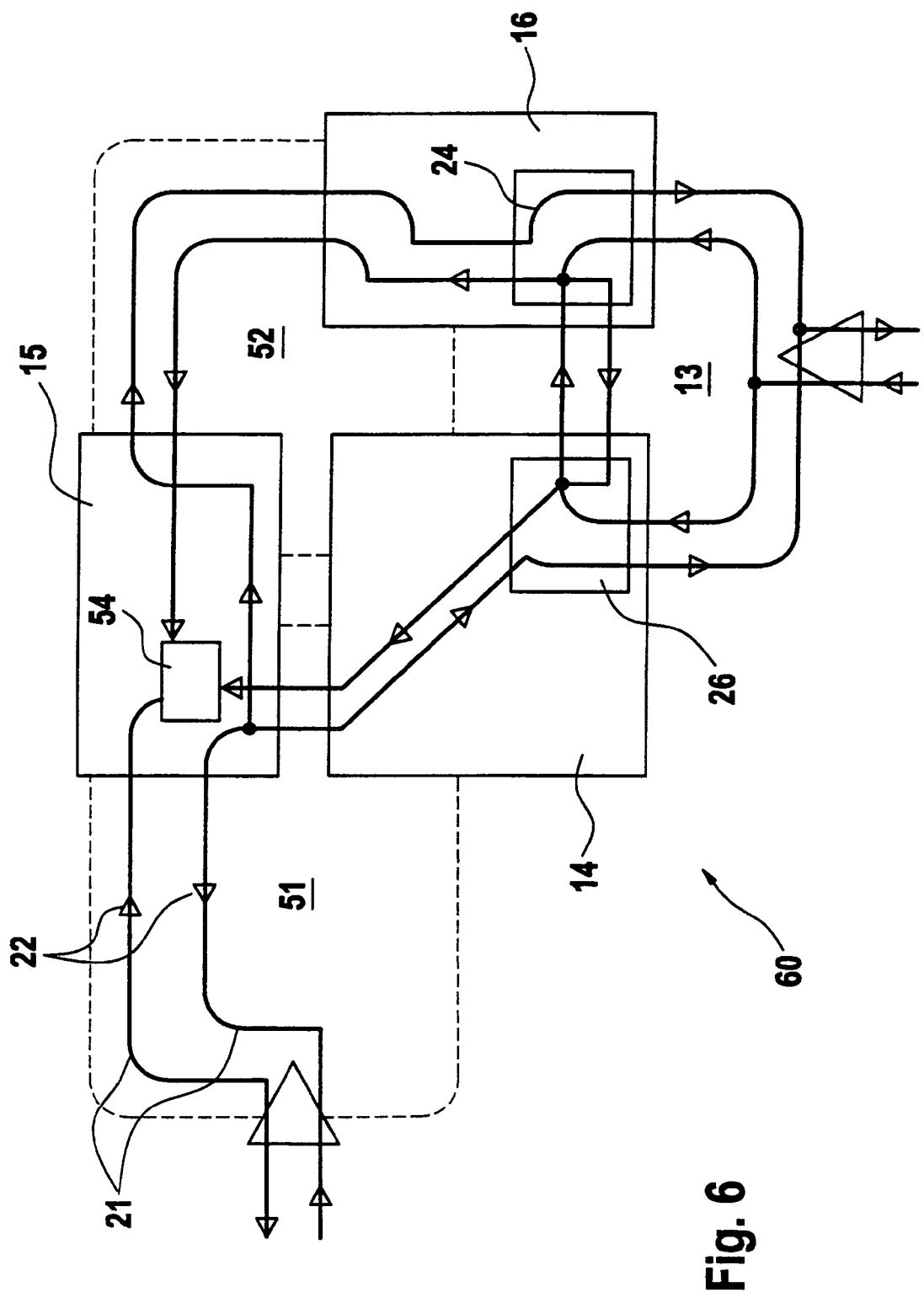

FIG. 6 illustrates a data transmission network 60 which corresponds substantially to the data transmission network 50 of FIG. 5. Corresponding features have therefore been provided with identical reference symbols.

In the data transmission network 60 illustrated in FIG. 6 however, the ring 13 for example from FIGS. 1 to 3 is provided in place of one of the two outer shared-protection-ring-connections 53 according to FIG. 5. As already explained, the ring 13 contains corresponding SNCPs for the fault elimination. This ring 13 is then coupled via the switching devices 26, 24 in the nodes 14, 16 to the shared-protection-ring-connections 51, 52 or the selector of the node 15.

What is claimed is:

1. A method of operating a data transmission network comprising at least two outer rings and a middle ring which are coupled to one another via nodes, wherein one of the nodes represents a central node for all three rings, and wherein switching devices for the establishment of connections are contained in each of the nodes, wherein the method comprises:
recognizing that a connection is to be established from the one outer ring to the other outer ring via the middle ring, and
establishing the connection using all three rings, wherein the connection is established by:
splitting the connection at a start point into two parallel connections and routing the connection via one of the outer rings;
routing one of the two parallel connections directly via the central node to the other outer ring;
routing the other of the two parallel connections via the middle ring to the other outer ring; and
combining the two parallel connections at an end point.

2. The method according to claim 1, wherein the central node comprises two switching devices, and wherein the connection is established via one of the two switching devices of the central node.

3. The method according to claim 2, wherein the connection is established as a shared-protection-ring.

4. The method according to claim 1, wherein establishment of the connection further comprises:
routing the two parallel connections to a switching device in the central node and to a switching device in one of the two other nodes, respectively,
routing, from each of the two switching devices, a connection to the respective other switching device, and
routing, from the two switching devices, two parallel connections via the middle ring to the other outer ring.

5. The method according to claim 1, wherein the middle ring comprises two connections parallel to one another, and wherein the connection is established via one of the two parallel connections.

6. The method according to claim 1, wherein at least one of the rings is a shared-protection-ring-connection.

7. The method according to claim 6, wherein at least one ring and at least one shared-protection-ring-connection are combined.

8. A data transmission network comprising:
at least two outer rings and a middle ring which are coupled to one another via nodes, wherein one of the nodes represents a central node for all three rings;
a plurality of switching devices for the establishment of connections disposed in each of the nodes; and
a controller that controls the plurality of switching devices, wherein the controller recognizes that a connection is to be established from the one outer ring to the other outer ring via the middle ring, and establishes the connection using all three rings by splitting the connection at a start point into two parallel connections and routing the connection via one of the outer rings, routing one of the two parallel connections directly via the central node to the other outer ring, routing the other of the two parallel connections via the middle ring to the other outer ring and combining the two parallel connections at an end point.

9. The network according to claim 8, wherein the central node comprises two switching devices, and wherein the connection is established via one of the two switching devices of the central node.

10. The method according to claim 9, wherein the connection is established as a shared-protection-ring.

11. The network according to claim 8, wherein establishment of the connection by the controller further comprises routing the two parallel connections to a switching device in the central node and to a switching device in one of the two other nodes respectively, routing from each of the two switching devices a connection to the respective other switching device, and routing, from the two switching devices, two parallel connections via the middle ring to the other outer ring.

12. The network according to claim 8, wherein the middle ring comprises two connections parallel to one another, and wherein the connection is established via one of the two parallel connections.

13. The network according to claim 8, wherein at least one of the rings is a shared-protection-ring-connection.

14. The method according to claim 13, wherein at least one ring and at least one shared-protection-ring-connection are combined.

* * * * *